United States Patent [19]
Cook et al.

[11] 3,789,783
[45] Feb. 5, 1974

[54] SEWING MACHINE AND MOTOR SPEED REGULATING SYSTEM THEREFOR

[76] Inventors: Albert N. Cook, 6 Stonehedge Ln., Madison, N.J. 07940; Lawrence R. Goetz, Rt. 3, Box 647, Monticello, Ind. 47960; Paul A. Manley, 1355 Brookfall Ave., Union, N.J. 07083; Joseph P. Yelpo, 28 Galaway Pl., Boonton, N.J. 07005

[22] Filed: June 1, 1973

[21] Appl. No.: 366,227

[52] U.S. Cl. ............................................... 112/220
[51] Int. Cl. .................................................. D05b 69/12
[58] Field of Search.... 112/220, 219 R, 219 A, 218, 112/221

[56] References Cited
UNITED STATES PATENTS

| | | | |
|---|---|---|---|
| 2,838,020 | 6/1958 | Eriksson | 112/220 |
| 3,051,109 | 8/1962 | Bialy | 112/220 |
| 3,141,429 | 7/1964 | Momberg et al. | 112/220 |
| 3,336,490 | 8/1967 | Yelpo et al. | 112/220 X |

*Primary Examiner*—H. Hampton Hunter
*Attorney, Agent, or Firm*—Marshall J. Breen; Chester A. Williams, Jr.; Joel Halpern

[57] ABSTRACT

A sewing machine having a solid state-controlled rectifier motor speed regulating system which includes a motor control module having electrical circuit components, a remotely located motor speed controller and switching means on the machine cooperably connecting said controller and circuit components through electrical circuitry incorporated in an end support base of a split housing for the motor. The end support base is adapted to mount the motor and motor control module and to also operably complete the electrical circuitry for the speed regulating system.

15 Claims, 7 Drawing Figures

PATENTED FEB 5 1974 3,789,783

SEWING MACHINE AND MOTOR SPEED REGULATING SYSTEM THEREFOR

BACKGROUND OF THE INVENTION

It has been known heretofore to provide the electrical motor of an electrically-driven sewing machine with a speed regulating system. U.S. Pat. No. 3,141,429 (Momberg et al.) granted July 21, 1964, discloses one such system in which an SCR (silicon controlled rectifier) is employed in conjunction with a remotely located speed-setting controller. It is also known to incorporate certain of the electrical circuit components of a motor speed regulating system on a circuit board, and to mount such board and the motor within a common housing. The aforesaid patent as well as U.S. Pat. No. 3,336,490 (Yelpo et al.) granted Aug. 15, 1967, may be referred to for constructions of this nature. However, such prior constructions required time consuming wiring operations to electrically connect the various elements of the speed regulating system, and were not readily adaptable to mass production techniques for replacement of the motor and/or elements of the speed regulating system. Further, the generation of heat within the motor housing creates a problem in that the solid state semiconductor elements utilized in SCR motor control circuits are extremely heat sensitive and are susceptible to damage unless adequate heat dissipation is provided or the amount of heat generated is drastically limited. It has also been characteristic of many prior motor speed control systems, that in the lower speed ranges the noise level of the motor increases to the point of being at best only marginally tolerable.

SUMMARY OF THE INVENTION

It is therefore one object of the present invention to provide an electrically-driven sewing machine having associated therewith a motor speed regulating system which permits operation at lower speeds at reduced noise levels.

It is another object of the invention to provide an electrically-driven sewing machine having associated therewith a motor speed regulating system in which the heat generated within the motor housing is reduced whereby the service life of solid state semiconductive elements positioned within the housing is enhanced.

It is still another object of this invention to provide an electrically-driven sewing machine having associated therewith a motor speed regulating system which includes a motor control module positioned within a split motor housing and a remotely located motor speed controller whereby elements of the system may be simply and rapidly replaced when desired with a minimum amount of time spent in wiring and rewiring.

It is yet another object of this invention to provide an electrically-driven sewing machine having associated therewith a motor speed regulating system in which certain of the electrical switching elements are so constructed that in cooperation with the motor housing structure, the system will meet the most stringent inspection requirements of governmental and underwriting agencies.

It is a further object of the invention to provide a motor module for a sewing machine readily mountable in the frame of the machine in which its speed regulating system is already substantially completely prewired.

It is still a further object of the invention, to provide electrical circuitry for a motor speed regulating system which minimizes the generation of heat and reduces noise levels in the lower motor speed ranges.

According to the present invention there is provided an electric motor module for a sewing machine having frame, a drive shaft journaled in said frame, stitch-forming instrumentalities operably connected to said drive shaft, and a separate and remotely located motor speed controller, said electric motor module comprising a split motor housing consisting essentially of an end support base and a cover detachably connected to said end support base, a motor assembly removably carried by said end support base, a motor control module mounted on said end support base including electrical circuit components adapted to regulate the flow of current to said motor within any of at least two predetermined motor speed ranges in cooperation with said remotely located speed controller, switch means mounted on said end support base cooperable with said circuit components and with said motor speed controller for selecting one of said predetermined speed ranges, and socket means formed in said end support base and adapted to connect the motor with a source of electric power and to operably connect said circuit components, switch means and motor speed controller.

According to the present invention, there is also provided in a sewing machine comprising a frame, a drive shaft journaled in said frame adapted to transmit reciprocatory movement to stitch sewing instrumentalities, a split motor housing carried by said frame, a motor mounted in said housing and adapted to impart rotary motion to said drive shaft, and a solid state controlled rectifier speed regulating system for said motor carried by said housing, the improvement which comprises the combination of a split motor housing consisting essentially of an end base support and a cover detachably connected thereto, a remotely located motor speed controller, said motor being removably carried by said end base support, a motor control module mounted on said end base support including electrical circuit components adapted to regulate the flow of current to said motor within any of at least two predetermined motor speed ranges in cooperation with said remotely located speed controller, switch means mounted on said end base support cooperable with said circuit components and motor speed controller for selecting one of said predetermined speed ranges, and socket means integrally formed in said end support base adapted to connect the motor with a source of electric power and to operably connect said circuit components, switch means and motor speed controller.

BRIEF DESCRIPTION OF THE DRAWINGS

In order that the invention may be more fully understood, it will now be described, by way of example, with reference to the accompanying drawings in which.

DETAILED DESCRIPTION OF THE INVENTION

Figure 1:
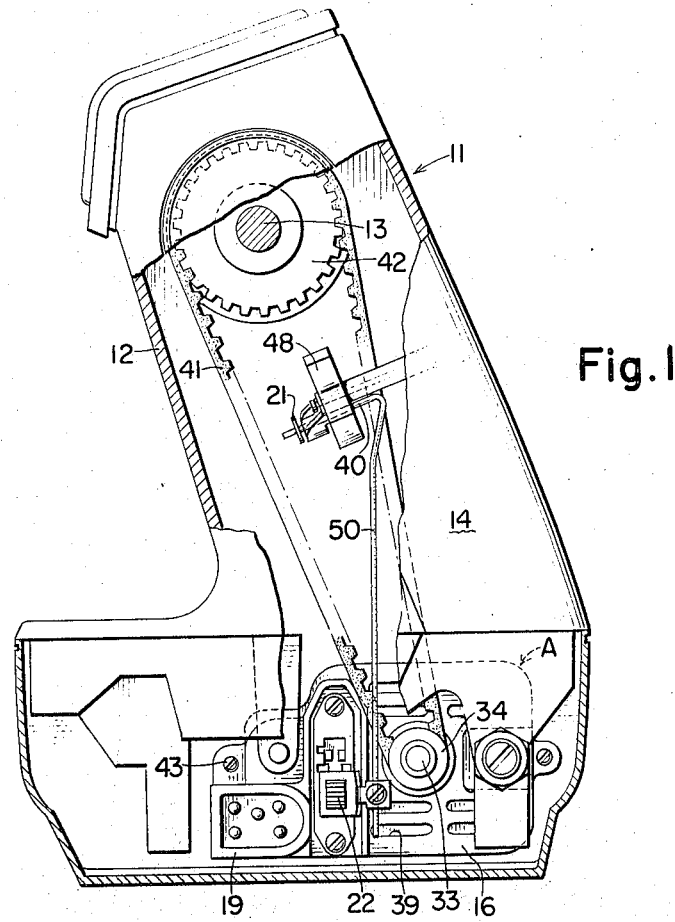
FIG. 1 is an end elevational view of an electrically-driven sewing machine, partly in section, in which the present invention has been incorporated.

Referring to FIG. 1 of the drawings, there is shown a sewing machine indicated generally by reference numeral 11. The machine includes a frame 12 which supports the operating mechanism, part of which is main drive shaft 13. An exterior casing 14 is customarily provided as a covering for the frame.

According to the preferred embodiment of the invention, an electric motor module A which includes a motor 15 mounted within a split housing 110 is carried by the frame beneath the bed casing. One mounting arrangement for the motor module which permits ready adjustment of the belt 41 connecting a sprocket 42 on the main drive shaft with a pulley 34 positioned on the motor drive shaft is disclosed in copending patent application Ser. No. 249,331, filed May 1, 1972. For a more detailed description of such a mounting arrangement, reference should be had to this copending application. The electric motor module of this invention comprises said split housing, consisting of an end support base 16 and a detachable cover 18, a motor assembly 15, a motor control module 20 and switch means 22 together with electrical circuitry operably connecting the motor and associated control elements as will be hereinafter described.

It will be observed that a manually operable selector 48 is journaled in the frame of the machine and that a pitman 50 is connected to a lug portion of the selector by virtue of having an end 40 thereof turned in so as to extend transversely with respect to the longitudinal axis of the pitman. This turned in end is carried rotatably within the lug, and is maintained in position by a lock washer 21. The other end of the pitman is secured to a switch 22 to be hereinafter described which is slidably mounted in end support base 16 of the motor housing. Thus, manual operation of selector 48 effectuates sliding movement of switch 22 to a position where the desired electric circuitry within the end support base is connected so as to set a predetermined speed range for the motor or to disconnect the motor from its electric supply. This feature is of importance in certain countries where it is required that switching controls accessible for manual operation be remotely connected with the electrical circuitry in order to minimize the risk of physical injury to the machine operator. Copending application Ser. No. 358,239, filed May 7, 1973 may be referred to for a more detailed description of this selector and switch arrangement.

Figure 2:
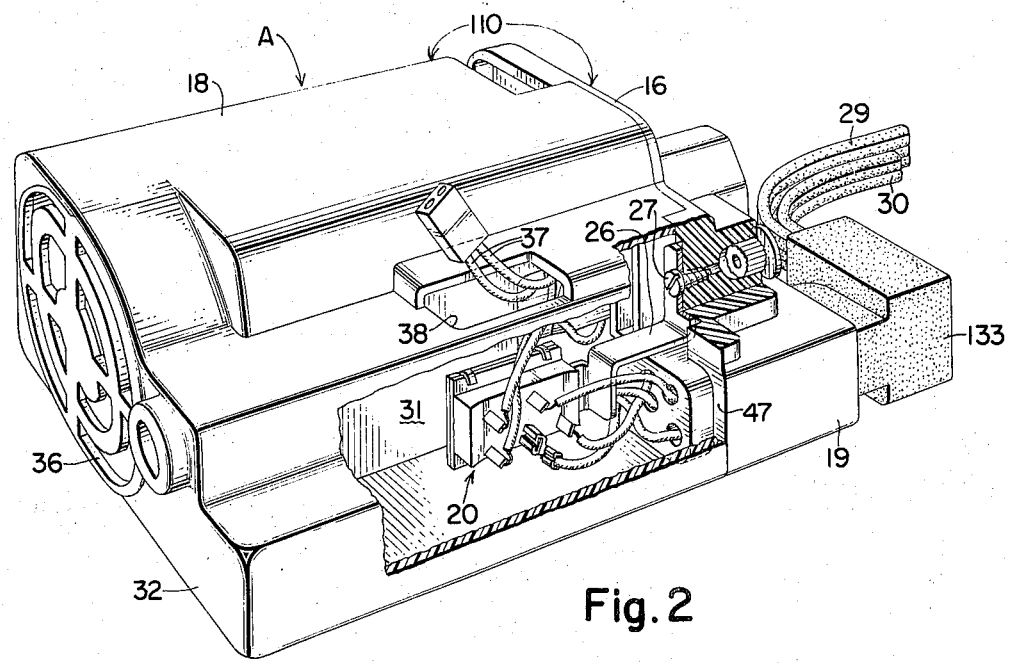
FIG. 2 is a perspecitve view of the split motor housing with a portion of the detachable cover broken away and partly base partly in section.
Figure 3:
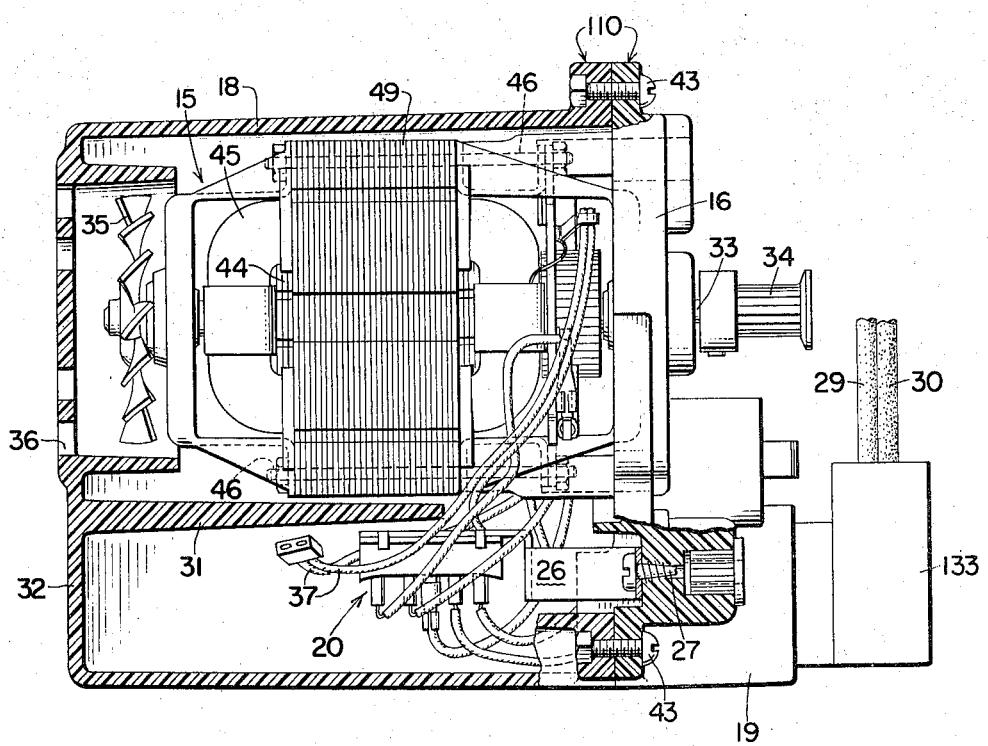
FIG. 3 is a sectional view of the module of FIG. 2.
Figure 4:
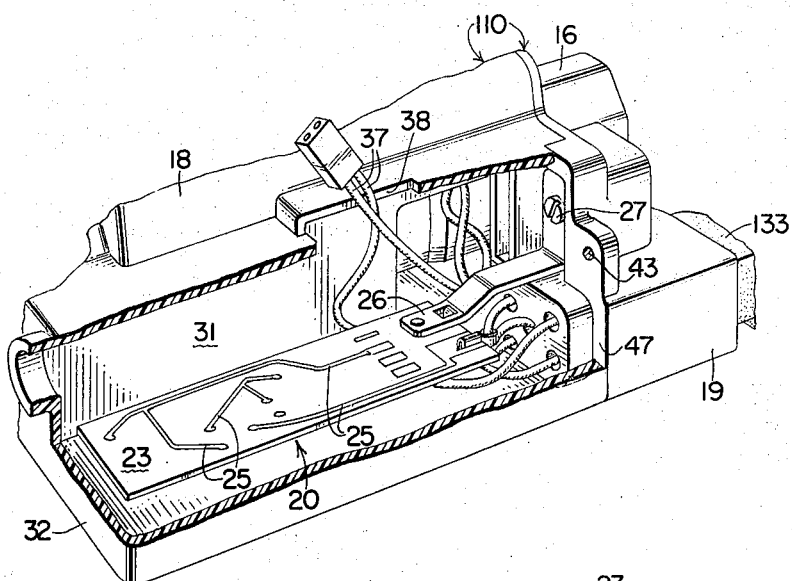
FIG. 4 is a perspective view of a portion of the motor housing with part of the detachable cover broken away to show a modified control module mounted therein.
Figure 5:
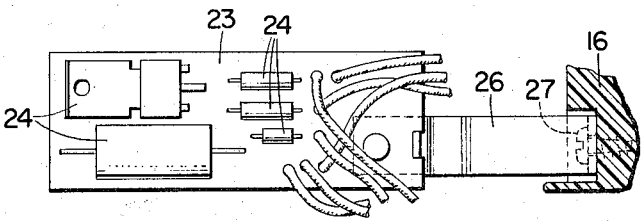
FIG. 5 is a bottom plan view of the control module shown in FIG. 4 and a sectional view of a portion of the end support base showing the mounting of the module thereon.

As shown in FIGS. 2 and 3, motor 15 is mounted within the split housing at 110. The housing, which is preferably formed of an insulating material such as a molded synthetic plastic material or the like, comprises end support base 16 and detachable cover portion 18. The two components of the split housing may be connected by any suitable fastening means such as by machine screws 43. The end support base is provided with a socket 19 formed integrally therewith. The socket has a plurality of electrically conducting terminals 145, 130, 163, 191, 189 (See FIG. 7) adapted to operably connect the motor control module 20, to be hereinafter described, with switch 22 and with a motor speed controller 137 located remote to the motor. Socket 19 also connects the motor with a source of electricity. The terminals of the socket extend completely through the wall of the end support base in order to conveniently provide such electrical interconnection. This makes possible the use of a motor control module which may be made readily detachable from the end support base. The module may comprise a completely integrated circuit mounted on a substrate, as is well known, or it may consist of a circuit board having printed circuits and discrete electrical components thereon. Alternatively, the module may comprise a hybrid unit in which integrated circuitry and certain discrete components are combined. Such a hybrid module is illustrated in FIGS 2 and 3, whereas FIGS. 4 and 5 depict a circuit board 23 with a number of discrete electrical components 24 connected by printed circuitry 25. In either instance, the motor control module may be provided with a metal bracket 26 which is secured, as by a self tapping screw 27, to the inner wall of the end support base 16. The metal bracket serves as a heat sink for heat generated by the motor control module.

FIGS. 2 and 3 also show plug 133 connected within the socket. Two leads are shown associated with the plug. Lead 29 is connected with a source of electric power which is the conventional 110 volt, 60 cycle, A.C. line. Lead 30 interconnects the switch 22 and control module 20 with the remotely located speed controller 137 which may conveniently be of the foot pedal type. The electrical circuitry for the switch, control module and speed controller is illustrated schematically in FIG. 7, and will be hereinafter described.

As may be clearly seen from FIG. 3 of the drawings, the detachable cover 18 is desirably provided with a partition 31 which extends inwardly from end wall 32 thereof. The partition serves to divide the interior of the housing into separate compartments for motor 15 and its control module 20. As will be noted particularly from FIG. 3, partition 31 does not extend the complete length of the housing so that there is communication between the compartments adjacent the end support base. Such communication is desirable, since it permits a flow of cooling air into the compartment in which the control module is positioned.

As is well known, the drive shaft 33 of the motor has a pulley 34 affixed thereto at the end which extends through the end support base. As stated above, the pulley is connected by a belt 41 with a sprocket 42 on the main drive shaft for the sewing machine so as to provide the driving power therefor. The other end of the motor drive shaft mounts a fan 35 which serves to induce a flow of cooling air through openings 39 in the end support base, over the parts of motor 15 such as the field core 49, armature 44 and associated windings 45, and out of openings 36 in the end wall of the detachable cover 18. A relatively minor portion of this air circulates through the compartment which houses the control module. By providing a common mounting support 16 the use of a motor module is facilitated. The motor 15 may be secured to the end support base 16 by fastening means such as bolts 46.

The wiring for the usual sewing machine light is depicted at 37. As shown, the leads extend through an opening 38 in the top portion of the detachable cover and may continue upwardly within the exterior casing of the machine to the bulb or lamp.

Figure 6:
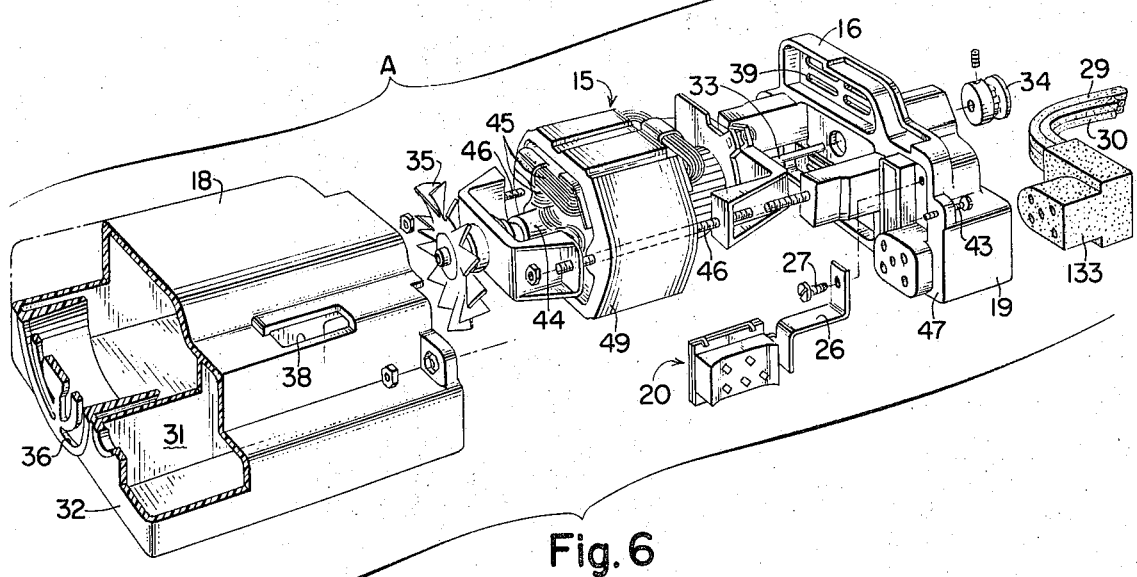
FIG. 6 is an exploded perspective view of the mechanical interrelationship between the elements of the motor speed regulating system.

FIG. 6 illustrates the mechanical elements of the motor module A. It will be noted that by providing a split motor housing in which one component, i.e., the end support base 16 is provided with integral socket 19 and switch means 22 as well as by being adapted to mount motor 15 and motor control module 20, and to electrically connect the various components, several advantages result. Thus, either the motor or the control module may be easily installed or replaced with a minimum of hand wiring required. The switch 22, in being similarly mounted on the common end support base 16, provides for a simple and extremely rapid connection of the motor and control module and with the remotely located speed controller 137 since the required electrical wiring may be connected by means of terminals carried by the end support base and through guiding passageways integrally formed therein.

Figure 7:
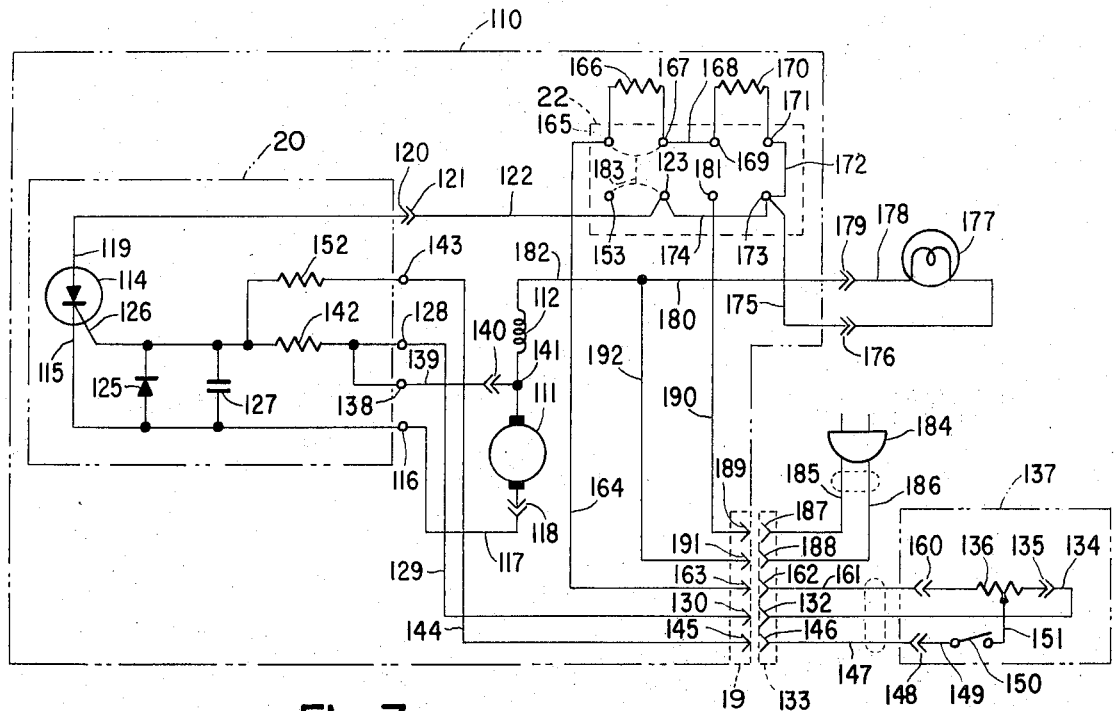
FIG. 7 is a schematic electrical circuit diagram of a controlled rectifier motor speed regulating system for a series commutating motor.

Referring to FIG. 7, and the electrical circuitry of the motor speed regulating system of this invention, there is shown diagrammatically an electric motor of the series commutated type which includes a motor housing 110. The motor has an armature winding 111 and a field winding 112. Mounted within the front portion of the motor is an integrated circuit module 20 or, alternatively, a printed circuit module as stated above.

Included in the integrated circuit module 20 is a silicon controlled rectifier 114 having a cathode 115 which is connected to terminal 116 of the module. Terminal 116 of the module is connected, via a lead 117 and mating connectors 118 to one end of the armature winding 111. The anode electrode 119 of SCR 114 is connected to terminal 120 of the integrated circuit module. Terminal 120 is adapted to have a mating connector 121 affixed thereon and is connected, via a lead 122, to terminal 123 of a main power switch 22.

A diode 125 has its cathode electrode connected to the gate electrode 126 of SCR 114 and its anode electrode connected to the cathode electrode 115 thereof. In parallel with diode 125 and connected across the gate and cathode electrodes of SCR 114 is a capacitor 127. Diode 125 prevents reverse voltages from appearing across the gate-cathode junction of SCR 114 which may damage it. Capacitor 127 functions to filter out any random noise commutation pulses which may erroneously fire (turn on) SCR 114.

A resistor 142 is connected from the gate electrode 126 of SCR 114, via terminal 128 of the integrated circuit module 20, a lead 129, a male terminal 130 provided in a male socket 19, a female terminal 132 of a female plug 133, a lead 134, mating connectors 135 to one end of potentiometer 136. Potentiometer 136 is desirably mounted in a conventional foot-controller assembly 137 remote from the sewing machine proper. Terminal 128 is internally connected to a terminal 138 of module 20 which in turn is connected, via a lead 139 and mating connectors 140 to a commonly connected point 141 of the armature and field windings 111 and 112 respectfully.

A second resistor 152 is connected from the gate electrode 126 of SCR 114, via a terminal 143, a lead 144, a male terminal 145 of plug 19, a female terminal 146 of plug 133, a lead 147, mating connectors 148, lead 149, an on-off speed control switch 150 to variable arm 151 of a potentiometer 136 located in the foot control assembly 137. The other end of potentiometer 136 is connected, via mating connectors 160, lead 161 a female terminal 162 of female plug 133, male terminal 163 of male plug 19, a lead 164 to a terminal 165 of the main power switch 22. Terminal 165 of the main power switch is coupled, via resistor 166 to a terminal 167 on the main power switch. Terminal 167 is connected, via a lead 168 to a terminal 169. Terminal 169 is connected, via a resistor 170 to a terminal 171 which is connected, via a lead 172 to terminal 173 of the main power switch 22. Terminal 173 is additionally connected, via a lead 174 to terminal 123.

Terminal 173 of the main power switch 22 is also connected, via a lead 175, mating connectors 176 to one side of a lamp 177 which may be mounted in the arm of the sewing machine. The other side of lamp 177 is connected, via a lead 178, mating connectors 179, leads 180 and 182 to one end of the motor field winding 112.

Main power switch 22, in the preferred embodiment, is provided with a pair of movable contacts 183 which are ganged together and operated from a linkage which couples the movable contacts with a manually operable selector 48 provided on the sewing machine frame. The movable contacts are shown in position 1 which is the off position. In the off position, one pair of contacts provides a low resistance path between terminals 165 and 167 of switch 124, a second pair of contacts provides low resistance between terminals 123 and 153 of switch 22. In the second position, which is the low speed condition, terminals 167 and 169 and terminals 123 and 181 are provided with a low resistance path or short circuit. In position 3, which is the high speed condition, contacts 183 provide a short circuit between terminals 169 and 171 and 173 and 181.

A conventional male electrical plug 184 adapted to be coupled to an electrical outlet, not shown, is coupled; via leads 185 and 186 to female terminals 187 and 188 respectfully, of female plug 133. The line voltage provided at the electrical outlet is coupled, via lead 185, a female terminal 187, a male terminal 189, a lead 190, to terminal 181 of main power switch 124. The other side of the line voltage is coupled via lead 186, a female terminal 188, a male terminal 191, a lead 192, a lead 182 to an end of the motor field winding 112.

It is to be noted that although the preferred embodiment of the invention described an integrated circuit module that contains an SCR 114, a diode 125, a capacitor 127, and resistors 142 and 152, which are fabricated by conventional integrated circuit or hybrid techniques, these components may be of the discrete type and separately inserted on a printed circuit board as shown in FIG. 5. The printed circuit board is completely interchangeable with the integrated circuit module and operates in the same manner. It is to be noted that plug and socket connections (connectors) have been provided so that the printed circuit module may be readily replaced by the intergrated circuit module at any time, should it be required.

It is also to be noted that the power to the lamp 177 is provided, via terminal 173 of the main power switch 22, and terminal 191 of socket 19, thereby, maintaining the lamp at full brightness although the movable contacts 183 are moved from the low to high position.

In operation, the plug 184 is inserted into a conventional AC outlet, which couples one side of the line voltage to terminal 181 of the main power switch 22. With movable contacts 183 in the position shown the motor circuit remains open and the sewing machine remains inoperative, since there is no conductive path between terminals 123, 173 and 181 on the main power switch. Then the movable contacts 183 are moved to the second or low speed position a short circuit path is provided between terminals 123 and 181 thereby coupling one side of the line voltage, via wire 122, mating connector 121 to the anode electrode 119 of the SCR. The cathode electrode 115 of the SCR 114 is coupled, via terminal 116, lead 117, connectors 118 to the armature winding 111 of the motor, which is connected in series with the field winding 112. The other end of the field winding 112 is connected to the other side of the line, via lead 182 and 192; terminals 188 and 191; and lead 186 of plug 184.

The voltage divider network which includes resistors 136, 166 and 170 is provided with voltage at this time. However, the foot controller assembly 137, which contains an on-off speed control switch 150 therein, will not be able to couple a voltage from the variable arm of potentiometer 136 to gate electrode 126 of the SCR until an operator depresses the foot controller to close switch 150. That is to say, the sewing machine will remain inoperative with the main power switch 22 moved to either the low or high position as long as the operator does not depress the foot controller closing the on-off speed control switch 150. When an operator depresses the foot controller closing switch 150 the gating voltage is coupled from the variable arm 151 of potentiometer 136 of the voltage divider network, via switch 150 and resistor 152 to the gate electrode of the SCR 114. With a positive voltage appearing at the gate electrode of the SCR it fires (turns on) permitting current flow from one side of the line through the armature and field windings to the opposite side of the line. Further depressing of the foot controller by the operator moves the variable arm of potentiometer 136 in a direction to increase the voltage available to the gate electrode of the SCR 114. With increased voltage coupled to the SCR gate the SCR fires earlier in the cycle thereby supplying increasing amounts of current to the armature and field of the motor increasing its speed.

The amount of voltage available to be coupled to the gate electrode of the SCR is related to the amount of voltage appearing across the potentiometer 136. The greater the amount of voltage coupled to the SCR the earlier the SCR will fire each cycle. Since the voltage divider network contains fixed resistors 166 and 170 in addition to a potentiometer 136 the voltage appearing across potentiometer 136 is proportional to the resistance value of potentiometer 136 in relation to the total resistance of the divider network. The range of operating speed of the motor may be increased by an operator moving the movable contacts 183 to its third or high speed position whereby resistor 170 is shorted. This increases the voltage available across potentiometer 136 thus permitting an operator to fire the SCR at a much earlier part of the cycle thereby providing additional current to the motor increasing its output speed.

When the operator removes his foot the foot controller, on-off speed switch 150 will return to its open condition thereby disconnecting the firing voltage from the gate electrode of the SCR. Without firing voltage appearing at the gate electrode of the SCR, it will extinguish itself (turn off) as soon as the line voltage goes to zero, thus prohibiting any further current from flowing to the motor, thereby stopping it.

It will be understood that various changes in the details, materials, arrangements of parts and operating conditions which have been herein described and illustrated in order to explain the nature of the invention may be made by those skilled in the art within the principles and scope of the invention.

Having thus set forth the nature of this invention, what is claimed herein is:

1. An electric motor module for a sewing machine having frame, a drive shaft journaled in said frame, stitch-forming instrumentalities operably connected to said drive shaft, and a separate and remotely located motor speed controller, said electric motor module comprisiing a split motor housing consisting essentially of an end support base and a cover detachably connected to said end support base, a motor assembly removably carried by said end support base, a motor control module mounted on said end support base including electrical circuit components adapted to regulate the flow of current to said motor within any of at least two predetermined motor speed ranges in cooperation with said remotely located speed controller, switch means mounted on said end support base cooperable with said circuit components and with said motor speed controller for selecting one of said predetermined speed ranges, and socket means formed in said end support base and adapted to connect the motor with a source of electric power and to operably connect said circuit componets, switch means and motor speed controller.

2. An electric motor module for a sewing machine according to claim 1, wherein the said end support base is provided with a cover receiving seat which receives and orients the cover properly with the said end support base.

3. An electric motor module for a sewing machine according to claim 2, wherein the said cover is provided with an integral partitiion disposed to provide an electric motor receiving compartment and a motor control module receiving compartment.

4. In a sewing machine comprising a frame, a drive shaft journaled in said frame adapted to transmit reciprocatory movement to stitch sewing instrumentalities, a split motor housing carried by said frame, a motor mounted in said housing and adapted to impart rotary motion to said drive shaft, and a solid state controlled rectifier speed regulating system for said motor carried by said housing, the improvement which comprises the combination of a split motor housing consisting essentially of an end support base and a cover detachably connected thereto, a remotely located motor speed controller, said motor being removably carried by said end support base, a motor control module mounted on said end support base including electrical circuit components adapted to regulate the flow of current to said motor within any of at least two predetermined motor speed ranges in cooperation with said remotely located speed controller, switch means mounted on said end support base cooperable with said circuit components and motor speed controller for selecting one of said predetermined speed ranges, and socket means integrally formed in said end support base adapted to connect the motor with a source of electric power and to operably connect said circuit components, switch means and motor speed controller.

5. A sewing machine according to claim 4, wherein said motor control module comprises a plurality of discrete electrical components, mounted on a printed circuit board.

6. A sewing machine according to claim 4, wherein said motor control module comprises an integrated circuit chip.

7. A sewing machine according to claim 5, wherein said motor control module is mounted on a metal bracket in heat sink relation therewith, said bracket being secured to said end support base in close proximity to said socket means.

8. A sewing machine according to claim 6, wherein said motor control module is mounted on a metal bracket in heat sink relation therewith, said bracket being secured to said end support base in close proximity to said socket means.

9. A sewing machine according to claim 6, wherein said motor control module includes at least one discrete electrical component.

10. A sewing machine according to claim 9, wherein said motor control module is mounted on a metal bracket in heat sink relation therewith, said bracket being secured to said end support base in close proximity to said socket means.

11. A sewing machine according to claim 5, wherein said switch means is positioned on the exterior of said end support base, said switch means being operably connected to manually operable selector means carried by said sewing machine frame whereby said switch means may be selectively regulated to disconnect the power supply to said motor and to establish quantitive limits for the flow of current to said motor to thus establish any of said predetermined motor speed ranges.

12. A sewing machine according to claim 6, wherein said switch means is positioned on the exterior of said end support base, said switch means being operably connected to manually operable selector mns carried by said motor and to establish quantitive limits for the flow of current to said motor to thus establish any of said predetermined motor speed ranges.

13. A sewing machine according to claim 9, wherein said switch means is positioned on the exterior of said end support base, said switch means being operably connected to manually operable selector means carried by said sewing machine frame whereby said switch means may be selectively regulated to disconnect the power supply to said motor and to establish quantitive limits for the flow of current to said motor to thus establish any of said predetermined motor speed ranges.

14. A sewing machine according to claim 4, wherein said motor control module comprises:
(a) an SCR having anode, cathode, and gate electrodes, said anode electrode being adapted to be connected to a source of AC voltage and said cathode electrode being coupled to one end of the armature winding of said motor; (b) a diode having cathode and anode electrodes, said cathode electrode being connected to the gate electrode of said SCR and said anode electrode being connected to the cathode electrode of said SCR; (c) a capacitor, said capacitor being connected from the gate electrode to the cathode electrode of said SCR; (d) a first resistor coupled from the gate electrode of said SCR to the other end of said armature winding; and (e) a second resistor coupled from the gate electrode of said SCR to said motor speed controller.

15. A sewing machine according to claim 14, wherein said motor speed controller is provided with a potentiometer having two end terminals and a variable arm terminal, one of said end terminals being coupled to the anode electrode of said SCR, the other end terminal being coupled to said other end of said armature winding, a normally open switch being also provided and having two terminals, said first switch terminal being connected to said variable arm terminal of said potentiometer and said second switch terminal being coupled to said gate electrode of said SCR, via said second resistor, whereby, an operator closing said normally open switch couples a firing voltage from the variable arm of said potentiometer to the gate electrode of said SCR.

* * * * *